(12) United States Patent
Sekido et al.

(10) Patent No.: US 12,102,927 B2
(45) Date of Patent: Oct. 1, 2024

(54) GAME SYSTEM, INFORMATION COMMUNICATION TERMINAL, AND PROGRAM

(71) Applicant: BANDAI CO., LTD., Tokyo (JP)

(72) Inventors: Hirohiko Sekido, Tokyo (JP); Yuta Shimano, Tokyo (JP); Fumiya Kobayashi, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 17/537,225

(22) Filed: Nov. 29, 2021

(65) Prior Publication Data
US 2022/0168655 A1   Jun. 2, 2022

(30) Foreign Application Priority Data

Dec. 2, 2020   (JP) ................................ 2020-200634

(51) Int. Cl.
*A63F 13/825*   (2014.01)
*A63F 13/537*   (2014.01)
*A63F 13/798*   (2014.01)

(52) U.S. Cl.
CPC .......... *A63F 13/825* (2014.09); *A63F 13/537* (2014.09); *A63F 13/798* (2014.09);
(Continued)

(58) Field of Classification Search
CPC ..... A63F 13/798; A63F 13/537; A63F 13/825
See application file for complete search history.

(56) References Cited

U.S. PATENT DOCUMENTS

| 2007/0066403 A1* | 3/2007 | Conkwright | .......... A63F 13/803 463/43 |
| 2012/0083705 A1* | 4/2012 | Yuen | .................... A61B 5/4866 702/19 |

(Continued)

FOREIGN PATENT DOCUMENTS

| JP | 2015-27343 A | 2/2015 |
| JP | 2015-027343 A | 2/2015 |

(Continued)

OTHER PUBLICATIONS

JP 2020-200634 Office action mailed Sep. 22, 2021, with English translation.
Gourmet Life Form Hungry Mogumon, App Fan vol. 4, Japan, Sep. 1, 2012, p. 154, Cosmic Publishing Co., Ltd., Japan, partial translation.
EP 21209053.4 Extended European Search Report mailed Apr. 21, 2022.

(Continued)

*Primary Examiner* — Reginald A Renwick
(74) *Attorney, Agent, or Firm* — Alston & Bird LLP

(57) ABSTRACT

A game system includes a game apparatus providing gameplay concerning development of characters evolving through multiple evolution stages and an information communication terminal with the game apparatus, which causes a display unit to display an evolution flow indicating a group of characters. Type information uniquely identifying the type and the evolution state of each character is defined. The evolution flow is displayed in an aspect in which at least part of the characters is unidentifiable in an initial state and is configured so that the number of kinds of the characters in each evolution stage is identifiable. The information communication terminal includes a first acquisition unit acquiring the type information and a display control unit that changes the evolution flow including the character having the acquired type information from an unidentifiable aspect to an identifiable aspect to cause the display unit to display the evolution flow.

8 Claims, 14 Drawing Sheets

| HEART RATE | HIGH | HIGH | MEDIUM | MEDIUM | LOW | LOW | LOW | NONE |
|---|---|---|---|---|---|---|---|---|
| PRESENCE OF MOVEMENT | MOVED | NONE | MOVED | NONE | MOVED | NONE | NONE | NONE |
| STATE OF ACTIVITY | RUNNING | SPECIAL TRAINING | WALKING | | | NORMAL | RESTING | NO-WEARING |
| DISPLAY STATUS | | | | | | | | |

(52) U.S. Cl.
CPC ..... *A63F 2300/558* (2013.01); *A63F 2300/65* (2013.01); *A63F 2300/8058* (2013.01)

(56) References Cited

U.S. PATENT DOCUMENTS

| | | | | |
|---|---|---|---|---|
| 2018/0181976 | A1* | 6/2018 | Takei | ................ G06Q 30/0277 |
| 2020/0016491 | A1 | 1/2020 | Kitsugi et al. | |
| 2020/0342648 | A1* | 10/2020 | Shimizu | ................... A61B 5/16 |
| 2021/0370181 | A1* | 12/2021 | Otomo | .................... A63F 13/58 |

FOREIGN PATENT DOCUMENTS

| | | |
|---|---|---|
| JP | 2020-006054 A | 1/2020 |
| KR | 2020-0006913 A | 1/2020 |

OTHER PUBLICATIONS

"Gourmet life form Hungry Mogumon, Let's raise Mogumon, a life form that grows by enjoying food," Kanako, English translation retrieved from: https://isuta.jp/category/iphone/107262 on Nov. 28, 2023, dated Jul. 22, 2011, updated Aug. 13, 2013.

"Monster Hunter: World—Monster Hunter Weapon Star Tree," Recommendation, Naver Blog, English translation retrieved from: https://blog.naver.com/PostPrint.naver?blogId=kimmy5000&logNo=221347321070 on Nov. 28, 2023, dated Aug. 28, 2018.

"Board Adults Are Always Sleepy," Hatena Blog, English translation retrieved from https://ayumoon.hatenadiary.org/entry/20110609/1307628096 on Nov. 28, 2023, dated Jun. 9, 2011.

Gourmet Life Form, Harapeko Mogmon, App Fan vol. 4, Cosmic Co., Ltd., Sep. 1, 2012, p. 154. English concise explanation.

* cited by examiner

FIG. 6A

| HEART RATE | HIGH | HIGH | MEDIUM | MEDIUM | LOW | LOW | LOW | NONE |
|---|---|---|---|---|---|---|---|---|
| PRESENCE OF MOVEMENT | MOVED | NONE | MOVED | NONE | MOVED | NONE | NONE | NONE |
| STATE OF ACTIVITY | RUNNING | SPECIAL TRAINING | WALKING | WALKING | WALKING | NORMAL | NORMAL RESTING | NO-WEARING |
| DISPLAY STATUS | | | | | | | | |

FIG. 6B

| CONDITION | GOOD | NORMAL | BAD |
|---|---|---|---|
| DISPLAY STATUS | | | |

FIG. 7

| DEVELOPING CHARACTER ID | PRESENCE OF MOVEMENT | MEASUREMENT TIME PERIOD | EVOLUTION SCORE | WINNING PERCENTAGE | NUMBER OF ACCOMPLISHED MISSIONS | EVOLUTION TARGET CHARACTER ID |
|---|---|---|---|---|---|---|
| egg000_mon05 | | 24h | 3000 | 12% | 70 | egg000_mon09 |
| | | 24h | 2500 | 10% | 50 | egg000_mon11 |
| | RUNNING | 24h | 2000 | 10% | 50 | egg000_mon13 |

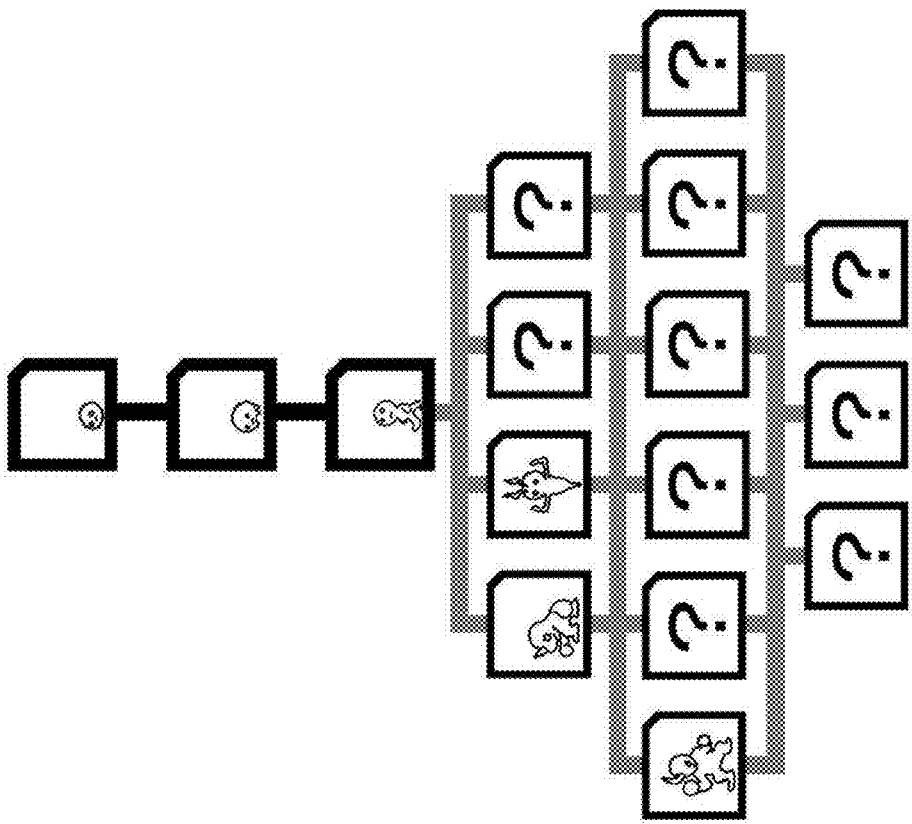
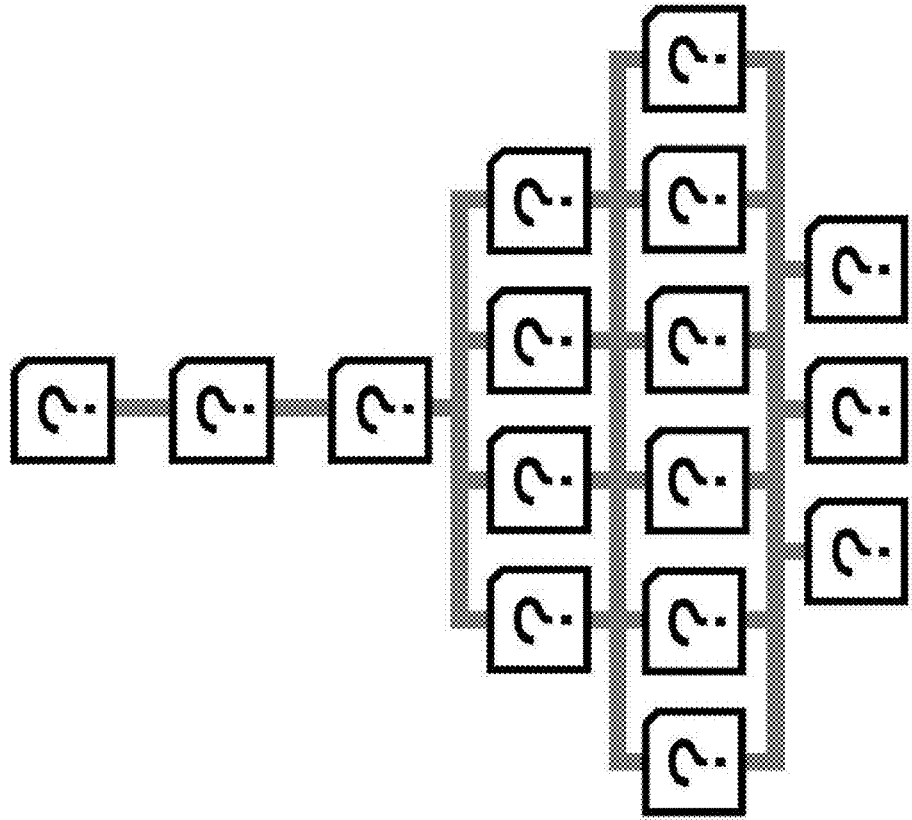

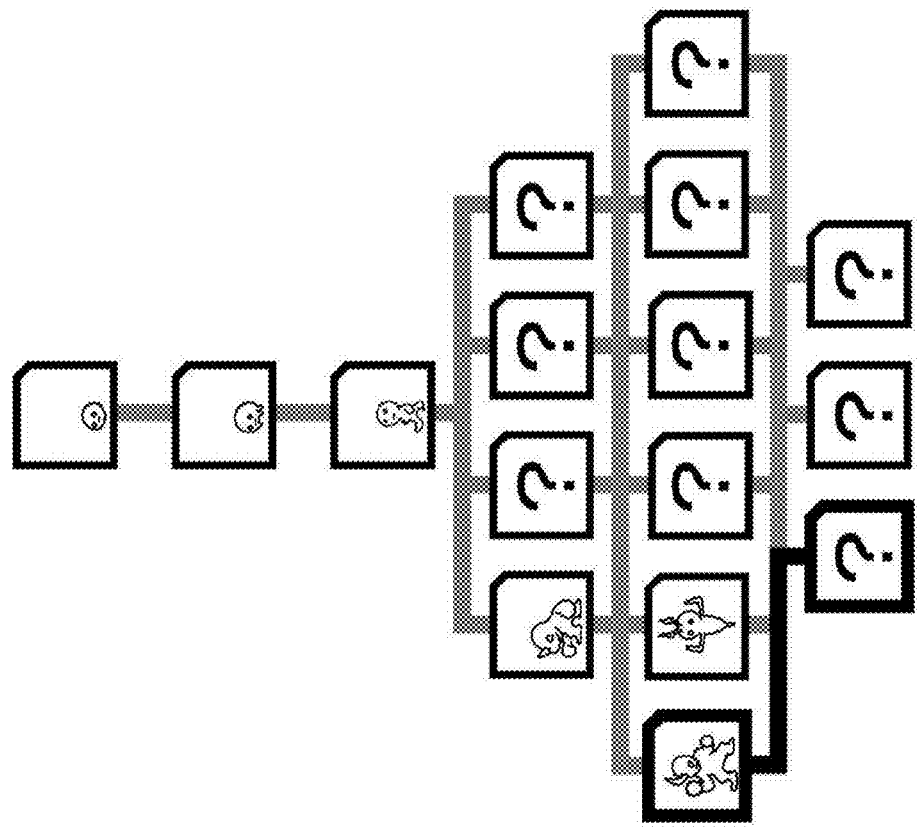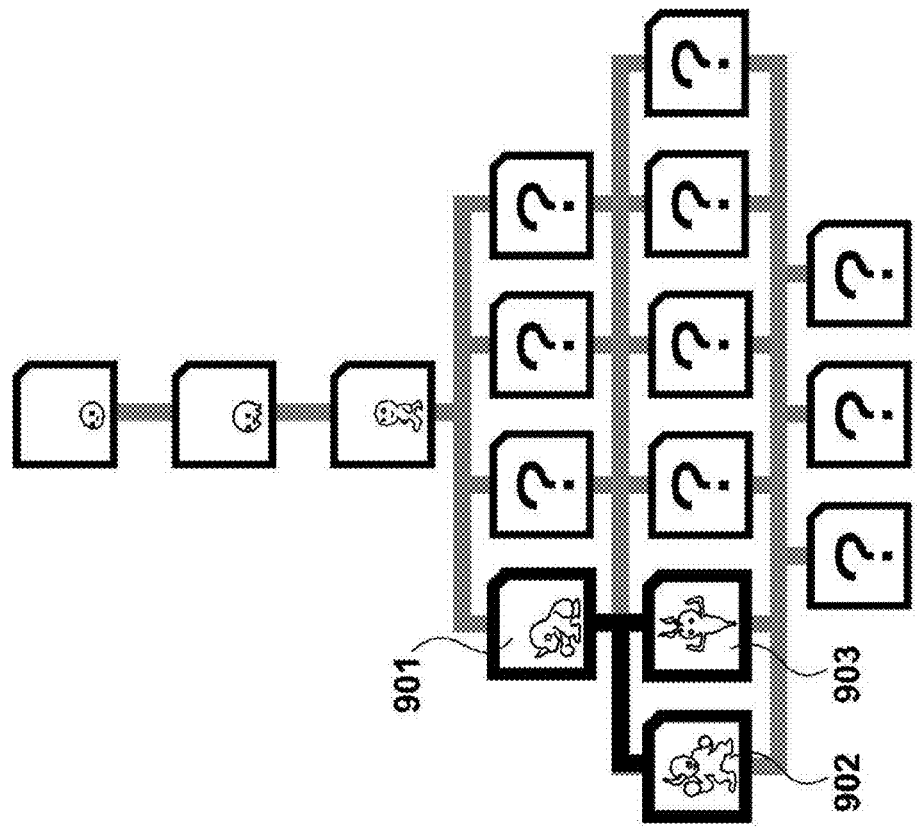

FIG. 14A

| | |
|---|---|
| EGG TYPE ID | ~1401 |
| BELONGING CHARACTER INFORMATION | ~1402 |
| EVOLUTION CONDITION INFORMATION | ~1403 |

FIG. 14B

| | |
|---|---|
| CHARACTER ID | ~1411 |
| EVOLUTION STAGE ID | ~1412 |
| DETAILED INFORMATION | ~1413 |
|     NAME | ~1421 |
|     DISPLAY INFORMATION | ~1422 |
|     TO-BE-OBTAINED INFORMATION | ~1423 |
|     PROFILE | ~1424 |
|     SKILL INFORMATION | ~1425 |
|     NATURE INFORMATION | ~1426 |

FIG. 14C

| | |
|---|---|
| EVOLUTION TARGET CHARACTER ID | ~1431 |
| REQUIRED EVOLUTION SCORE | ~1432 |
| REQUIRED FIGHTING RECORD | ~1433 |
| REQUIRED-NUMBER-OF-ACCOMPLISHED-MISSIONS | ~1434 |

FIG. 14D

| | |
|---|---|
| USER ID | ~1441 |
| USED CHARACTER ID | ~1442 |
| FIGHTING RECORD INFORMATION | ~1443 |

FIG. 14E

| | |
|---|---|
| CHARACTER ID | ~1451 |
| EVOLUTION HISTORY INFORMATION | ~1452 |
| FIGHTING RECORD INFORMATION | ~1453 |
| AMOUNT-OF-ACTIVITY INFORMATION | ~1454 |
| CONDITION INFORMATION | ~1455 |
| DISPLAY STATUS | ~1456 |
| EVOLUTION SCORE | ~1457 |
| SET MISSION INFORMATION | ~1458 |
| ACCOMPLISHED MISSION INFORMATION | ~1459 |

GAME SYSTEM, INFORMATION COMMUNICATION TERMINAL, AND PROGRAM

CROSS REFERENCES TO RELATED APPLICATIONS

This application claims priority to Japanese Patent Application No. 2020-200634 filed in the Japan Patent Office on Dec. 2, 2020, the entire content of which is incorporated herein by reference.

BACKGROUND

Field of the Invention

The present invention relates to a game system, an information communication terminal, and a program. In particular, the present invention relates to an electronic game having a function to develop characters.

Description of the Related Art

Technologies to compose pictorial books are provided, in which registered characters registered by users and non-registered characters that are not registered by the users can be identifiable in a list format in order to enable the users to easily know the collection status of the characters in games (for example, refer to Japanese Unexamined Patent Application Publication No. 2015-027343).

However, although the registered characters can be discriminated from the non-registered characters in the pictorial book described in Japanese Unexamined Patent Application Publication No. 2015-027343, the pictorial book described in Japanese Unexamined Patent Application Publication No. 2015-027343 does not present a specific guideline indicating how the user advances the game to complete the pictorial book.

SUMMARY

Accordingly, it is an object of the present invention to provide a game system, an information communication terminal, and a program that enables easy understanding of characters to be developed.

A game system according to an embodiment of the present invention includes a game apparatus that provides gameplay concerning development of characters that evolve through multiple evolution stages and an information communication terminal that is capable of communicating with the game apparatus and that causes a display unit to display an evolution flow indicating a group of characters capable of deriving and evolving from at least one character. Type information is defined for each character capable of being developed in the game apparatus, which uniquely identifies a type and an evolution state of the character. The evolution flow is displayed in an aspect in which at least part of the characters is unidentifiable in an initial state and is configured so that the number of kinds of the characters in each evolution stage is identifiable for the group of characters. The information communication terminal includes a first acquisition unit that acquires the type information about a character that has been developed in the game apparatus and a display control unit that changes the evolution flow including the character having the type information acquired by the first acquisition unit from an aspect in which the developed character is unidentifiable to an aspect in which the developed character is identifiable to cause the display unit to display the evolution flow in the identifiable aspect.

According to an embodiment of the present invention, easy understanding of characters to be developed is enabled.

BRIEF DESCRIPTION OF THE DRAWINGS

FIG. 6A and FIG. 6B are diagrams for describing display statuses of a developing character in the game apparatus according to the embodiment of the present invention;

FIG. 7 is a diagram for describing an evolution condition of the characters in the game apparatus according to the embodiment of the present invention;

FIG. 8A and FIG. 8B are diagrams for describing an evolution flow displayed in the smartphone according to the embodiment of the present invention;

FIG. 9A and FIG. 9B are other diagrams for describing the evolution flow displayed in the smartphone according to the embodiment of the present invention;

FIG. 14A to FIG. 14E are diagrams indicating the data structures of a variety of information used in the game system according to the embodiment of the present invention.

DETAILED DESCRIPTION

Embodiments

Figure 1:
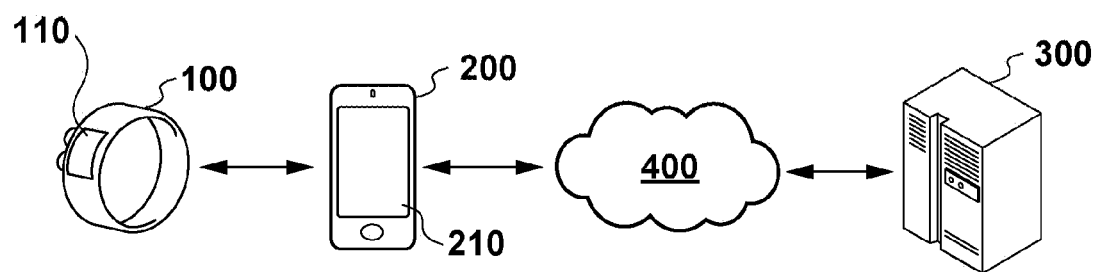
FIG. 1 is a diagram illustrating an example of the configuration of a game system according to an embodiment of the present invention.

Embodiments of the present invention will herein be described in detail with reference to the drawings. The embodiments described below do not limit the invention according to the claims and all combinations of features described in the embodiments are not necessarily essential. Two or more features, among the multiple features described in the embodiments, may be arbitrarily combined. The same reference numerals are used to identify the same components or similar components and a duplicated description of such components is omitted herein.

An example is described in an embodiment described below, in which the present invention is applied to a game system. The game system includes a game apparatus capable of providing gameplay concerning development of characters that evolve through multiple evolution stages and a smartphone capable of cooperation with the game apparatus. The above game apparatus is an exemplary game apparatus. The above smartphone is an exemplary information communication terminal. However, the present invention is applicable to a system including a device capable of providing the gameplay concerning development of characters that evolve through the multiple evolution stages and another device capable of performing display based on information acquired from the device.

In this specification, a state in which a wearer of the game apparatus is "active" is not limited to a state in which the wearer performs a certain body action and is described as including a state in which a certain change occurs in, for example, a sympathetic nervous system of the wearer. Although the "wearer" is described as meaning a user who wears a game apparatus 100 (hereinafter referred to as a wearing state), the "wearer" does not exclude the user who temporarily does not wear the game apparatus 100. Since the wearing of the game apparatus 100 is not essential to use the game system, the "wearer" is referred to as the "user" who uses the game system, if needed, in the following description of the embodiments.

Configuration of Game System

FIG. 1 is a diagram illustrating an example of the configuration of a game system of the present embodiment. As illustrated in FIG. 1, the game system of the present embodiment includes the game apparatus 100 including various sensors capable of detecting and measuring the state of activity of the wearer in the wearing state, a smartphone 200 capable of performing information communication with the game apparatus 100, and a server 300 capable of communicating with the smartphone 200.

The game apparatus 100 is formed into, for example, a bracelet shape and the wearer can wear the game apparatus 100 having the bracelet shape on his/her wrist. The game apparatus 100 is capable of measuring various items concerning the state of activity of the wearer in the wearing state. Although the wearer is described as wearing the game apparatus 100 on his/her wrist in order for the wearer to easily confirm the content of display in a display unit 110 described below in the game apparatus 100 in the present embodiment, the present invention is not limitedly embodied in the above manner. The wearer may wear the game apparatus 100 on any body portion, such as his/her finger, upper arm, hip, or leg.

The game apparatus 100 is capable of executing an electronic game (development game) concerning development of characters and controls progress of the development game in accordance with a measurement result of the state of activity during startup. In the development game that is executed, the user can develop one character at one time and evolves the character and its appearance through the multiple evolution stages to realize development representation. In addition, the development game may be restarted on the condition that a certain condition is met and the user can repeatedly perform the development of characters through various evolution processes.

In order to ensure the fairness between the users, evolvable character types are determined in advance in the development representation of the characters. The characters capable of deriving and evolving from at least one initial character (or an egg from which the initial character is born) are determined in advance for each evolution stage and branching is defined so that the initial character is capable of evolving into multiple types of characters in at least part of the evolution stages to improve the diversity of the development game and make the development game more interesting. This will be described in detail below. In the following description, a group of characters capable of deriving and evolving from the at least one initial character is referred to as a character group belonging to (one) egg type.

The smartphone 200 is a general-purpose information communication terminal, such as a mobile phone or a smartphone. Upon execution of programs in a dedicated application concerning use of the game system, the smartphone 200 is in a state in which the smartphone 200 is capable of providing a variety of display and various graphical user interfaces (GUIs) concerning use of the game system.

The game apparatus 100 is capable of being connected to the smartphone 200 through, for example, near field communication and communication connection is established between the game apparatus 100 and the smartphone 200 in response to operation inputs concerning start of communication in the development game and the dedicated application. When the communication connection is established between the game apparatus 100 and the smartphone 200, transfer to the smartphone 200 of information indicating the progress of the development game that is being executed in the game apparatus 100 and transfer to the game apparatus 100 of settings that are made using the dedicated application and update information that is acquired are performed.

Although the game system is described as including the server 300 as a device that provides services concerning the game system in the description of the present embodiment, the server 300 is not an essential component in the embodiments of the present invention. In the present embodiment, the communication connection is established between the smartphone 200 and the server 300 over a network 400.

Configuration of Game Apparatus

The functional configuration of the game apparatus 100 in the game system of the present embodiment will now be described with reference to a block diagram in FIG. 2.

Figure 2:
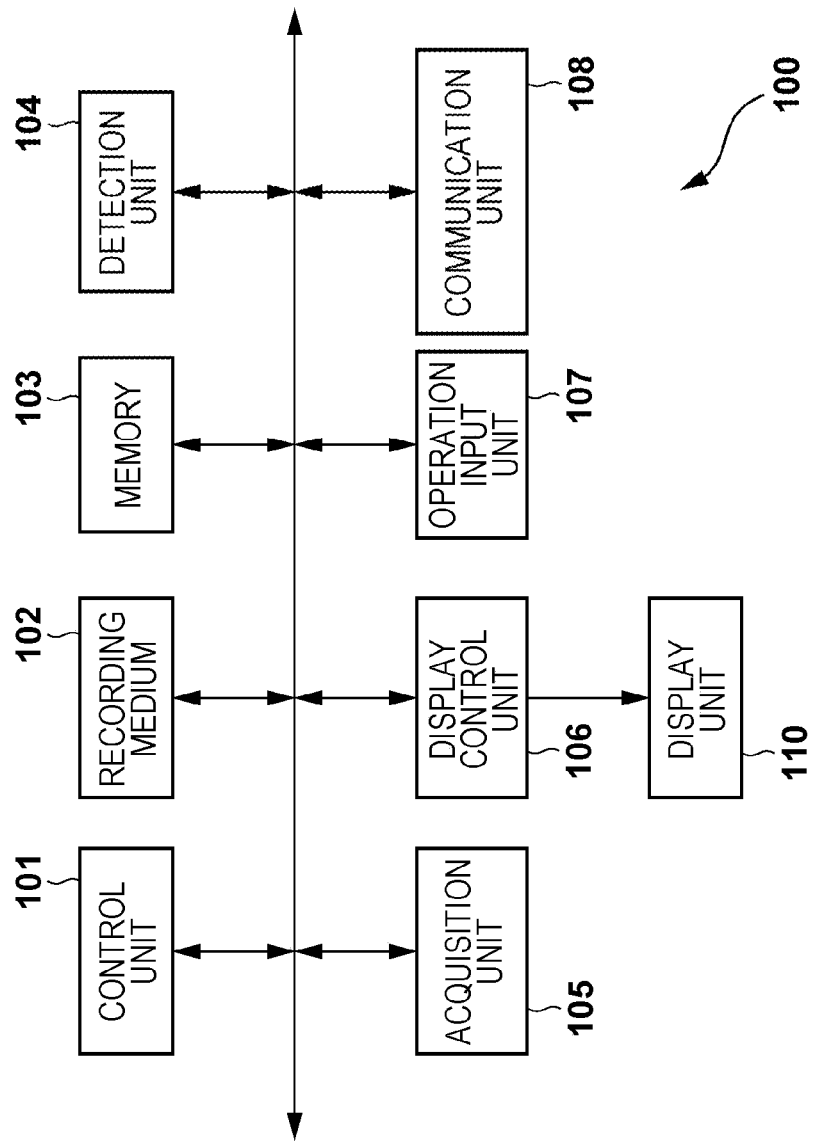
FIG. 2 is a block diagram illustrating the functional configuration of a game apparatus according to an embodiment of the present invention.

Referring to FIG. 2, a control unit 101 is, for example, a microcomputer and controls the operation of each block in the game apparatus 100. Specifically, the control unit 101 reads out an operation program of each block, which is recorded on a recording medium 102, and decomposes the operation program in a memory 103 for execution to control the operation of each block.

The recording medium 102 is a recording unit, such as a non-volatile memory, which is capable of permanently holding data. In addition to the operation program of each block in the game apparatus 100, parameters necessary for the operation of each block, information (development information) indicating the progress status of the development game, and so on are recorded on the recording medium 102. The memory 103 is a storage unit, such as a volatile memory, used for temporary data storage. The memory 103 is used as not only a decomposition area of the operation program of each block but also a storage area in which data and the like, which are output in the operation of each block, is temporarily stored.

A detection unit 104 detects a variety of information indicating the state of activity of the wearer and outputs the detection result. In the present embodiment, the detection unit 104 includes an acceleration sensor and a heart rate sensor. The acceleration sensor detects movement occurring in the game apparatus 100 and the heart rate sensor detects the heartbeat of the wearer. Although a detailed description of the acceleration sensor and the heart rate sensor is omitted herein, the output of the detection result by the detection unit 104 is performed at predetermined time intervals and includes information about the number of steps and the heart rate, which has detected after the last output.

An acquisition unit 105 acquires a variety of information about the development game from a memory card (not illustrated) loaded in the game apparatus 100. Although the game apparatus 100 of the present embodiment is capable of executing the development game concerning the character group belonging to at least one egg type (initial egg type) in factory default settings, the game apparatus 100 is capable of executing the development game concerning the character group belonging to a new egg type (other than the initial egg type) upon acquisition of information from a memory card (egg type card) enabling the development of other egg types by the acquisition unit 105 at specific timing. The game apparatus 100 of the present embodiment is capable of using a memory card (fighting card) for a fighting game as one method of realizing the fighting game using a developing character. This will be described below. When information about any character is stored in the fighting card, the fighting game is executed in the game apparatus 100 upon acquisition of the information by the acquisition unit 105 in the game apparatus 100 and information about a fighting result of the fighting game is stored in the fighting card. When the fighting card is loaded again in the game apparatus 100 performing the storage of the information about the character, the acquisition unit 105 acquires the information about the fighting result.

A display control unit 106 controls display of information in the game apparatus 100. The display control unit 106 creates various screens concerning the development game to be displayed in the display unit 110, which may be a liquid crystal display (LCD) or the like, using display information recorded on the recording medium 102 for the developing character.

An operation input unit 107 is a user interface, such as a physical operation member (button), of the game apparatus 100. Upon detection of an operation input with the operation member, the operation input unit 107 supplies a control signal corresponding to the operation input to the control unit 101.

A communication unit 108 is a communication interface with the smartphone 200 of the game apparatus 100. The communication unit 108 is not constantly in the communication connection state and makes a transition to a state in which the communication connection is available in response to the operation input to select an item concerning start of communication from a menu or the like of the development game, as described above. In addition, the communication unit 108 also functions as a communication interface that performs proximity wireless communication with a certain device. In the proximity wireless communication, the communication connection is established in response to detection of proximity to the certain device and is disconnected after required information is acquired.

Configuration of Smartphone

The functional configuration of the smartphone 200 in the game system of the present embodiment will now be described with reference to a block diagram in FIG. 3. The various functional components in the smartphone 200 described below include the functional components concerning the configuration specific to the smartphone 200 and the functional components realized in response to execution of the dedicated application. In the following description, prefix letters "terminal" are added to the components realizing the same functions as those of the game apparatus 100 for distinction.

Figure 3:
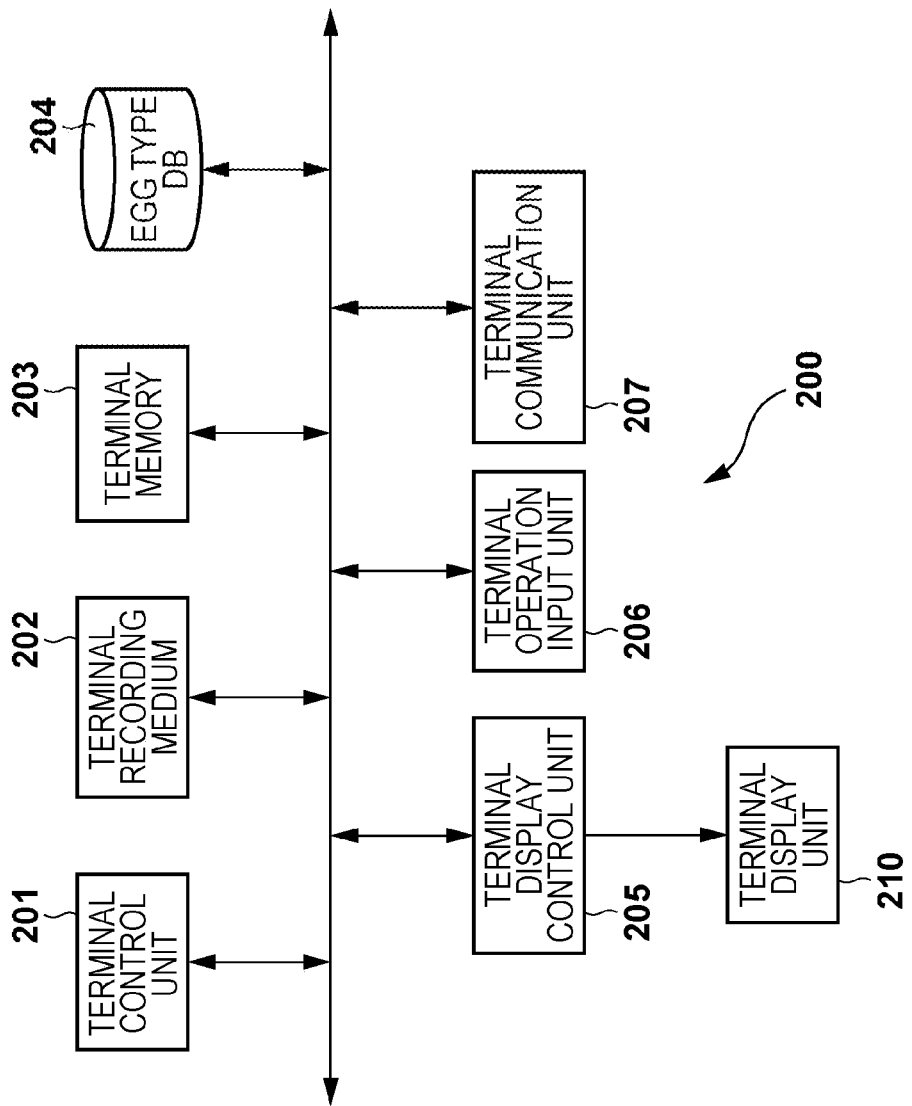
FIG. 3 is a block diagram illustrating the functional configuration of a smartphone according to an embodiment of the present invention.

Referring to FIG. 3, a terminal control unit 201 is, for example, a central processing unit (CPU) and controls the operation of each block in the smartphone 200. Specifically, the terminal control unit 201 reads out an operation program of each block, which is recorded on, for example, a terminal recording medium 202, and a program of a presentation application including the display function of the measurement result and decomposes the operation program and the program of the presentation application in a terminal memory 203 for execution to control the operation of each block.

The terminal recording medium 202 is a recording unit, such as a non-volatile memory or a hard disk drive (HDD), which is capable of permanently holding data. In addition to the operation program of each block in the smartphone 200 and the programs of the dedicated application, parameters necessary for the operation of each block, display information, and so on are recorded on the terminal recording medium 202. The terminal memory 203 is a storage unit, such as a volatile memory, used for temporary data storage. The terminal memory 203 is used as not only the decomposition area of the operation program of each block but also the storage area in which data and the like, which are output in the operation of each block, is temporarily stored.

An egg type database (DB) 204 is a database used to manage information (egg type information) about the egg types, which can be developed in the development game in the game system of the present embodiment. The egg type information may include, for example, belonging character information 1402 and evolution condition information 1403 in association with an egg type identification (ID) 1401 uniquely identifying the egg type, as illustrated in FIG. 14A. The belonging character information 1402 indicates the character group belonging to the egg type. The evolution condition information 1403 indicates an evolution condition in each evolution stage in the development of the characters belonging to the egg type. The belonging character information 1402 may include, for example, an evolution stage ID 1412 and detailed information 1413 in association with a character ID 1411 uniquely identifying the character for each of the characters belonging to the egg type, as illustrated in FIG. 14B. The evolution stage ID 1412 identifies the evolution stage of the character belonging to the egg type. The detailed information 1413 indicates a variety of information concerning the character. The detailed information 1413 about each character may include a name 1421 of the character, display information 1422 used to display the character in the smartphone 200, to-be-obtained information 1423 indicating the condition (the egg type card to be obtained) to release the development of the character in the game apparatus 100, a profile 1424 on the game, which is set for the character, skill information 1425 indicating a special skill that can be exercised in the fighting game described below, and nature information 1426 describing how to update the condition of the character in the development game. The evolution condition information 1403 about the egg type may include, for example, an evolution target character ID 1431, a required evolution score 1432, a required fighting record 1433, and a required-number-of-accomplished-missions 1434 for each of the characters belonging to the egg type, as illustrated in FIG. 14C. The evolution target character ID 1431 identifies each of the characters into which the character is capable of evolving in the next evolution stage. The required evolution score 1432 indicates a threshold value of an evolution score necessary for the evolution into the characters. The required fighting record 1433 indicates a fighting record (for example, a winning percentage) of the fighting game necessary for the evolution into the characters. The required-number-of-accomplished-missions 1434 indicates the number of accomplished missions necessary for the evolution into the characters. The condition, the evolution score, the fighting game, and the content of the missions are described in detail below.

A terminal display control unit 205 controls display of information in the smartphone 200. The terminal display control unit 205 includes a drawing device, such as a drawing chip, and performs a certain drawing process in creation of the screen to be displayed in a terminal display unit 210, which may be an LCD or the like. In the smartphone 200 of the present embodiment, execution of the dedicated application enables various elements that enhances the interesting experience of the development game that is being executed in the game apparatus 100 to be presented to the user through the display of information.

A terminal operation input unit 206 is a user interface, such as an operation member or various sensors, of the smartphone 200. Upon detection of an operation input with the operation member or any of the various sensors, the terminal operation input unit 206 supplies a control signal corresponding to the operation input to the terminal control unit 201. In the present embodiment, the terminal operation input unit 206 includes, for example, a touch-input detection sensor that detects touch input on the screen of the terminal display unit 210, in addition to the physical operation member.

A terminal communication unit 207 is a communication interface with an external apparatus of the smartphone 200. In the present embodiment, the terminal communication unit 207 performs the near field communication with the game apparatus 100 to receive the development information about the development game that has been executed in the game apparatus 100. The terminal communication unit 207 is connected to the server 300 over the network 400 to transmit and receive information to and from the server 300.

Configuration of Server

The functional configuration of the server 300 in the game system of the present embodiment will now be described with reference to a block diagram in FIG. 4. In the description of the functional components in the server 300, prefix letters "server" are added to the components realizing the same functions as those of the game apparatus 100 and the smartphone 200 for distinction.

Figure 4:
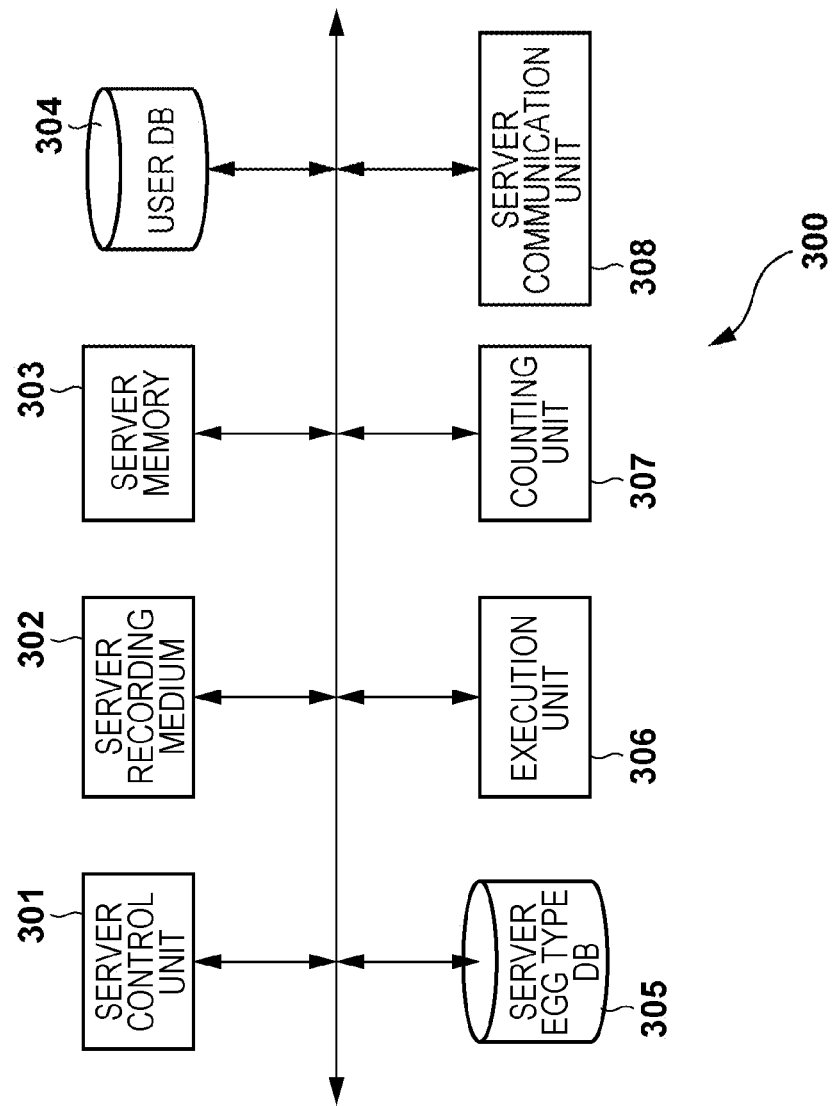
FIG. 4 is a block diagram illustrating the functional configuration of a server according to an embodiment of the present invention.

Referring to FIG. 4, a server control unit 301 is, for example, a CPU and controls the operation of each block in the server 300. Specifically, the server control unit 301 reads out an operation program of each block, which is recorded on, for example, a server recording medium 302, and decomposes the operation program in a server memory 303 for execution to control the operation of each block.

The server recording medium 302 is a recording unit, such as a non-volatile memory or an HDD, which is capable of permanently holding data. In addition to the operation program of each block in the server 300, information about parameters necessary for the operation of each block and so on are recorded on the server recording medium 302. The server memory 303 is a storage unit, such as a volatile memory, used for temporary data storage. The server memory 303 is used as not only the decomposition area of the operation program of each block but also the storage area in which data and the like, which are output in the operation of each block, are temporarily stored.

A user DB 304 is a database used to manage a variety of information (user information) for each user using the game system. The user information managed for one user may include, for example, a used character ID 1442 and fighting record information 1443 about the fighting game performed over the network 400 in association with a user ID 1441 uniquely identifying the user, as illustrated in FIG. 14D. The used character ID 1442 identifies the character that is being developed in the game apparatus 100 used by the user or the character used in the fighting game.

A server egg type DB 305 is a database used to manage the egg type information referred to in the process of the fighting game performed in the server 300 and a counting process. The egg type information is described as having the same structure as that of the egg type information managed in the egg type DB 204 in the present embodiment for convenience of understanding of the invention.

An execution unit 306 executes the fighting game in which the character of each user fights with another character, which is realized over the network 400. The fighting game realized over the network 400 is, for example, a raid battle in which the character of each of the multiple users fights against a common enemy or a VS battle in which the characters of the users fight with each other.

A counting unit 307 counts the points that are subjected to addition based on the result of the fighting game executed by the execution unit 306 to create a user ranking based on the total number of points. The user ranking is created for each of the raid battle and the VS battle and is provided at an appropriate time so as to enable browsing on each smartphone 200. The user ranking may include, for example, the user name, the number of points, and information about the used character for the user of each rank.

A server communication unit 308 is a communication interface for communication with another apparatus of the server 300. The server communication unit 308 is connected to each smartphone 200 over the network 400 using a certain communication method to transmit and receive data to and from the smartphone 200. The communication method may be a wired communication method or a wireless communication method.

Development of Character

Development elements of the character, which are realized by the development game executed in the game apparatus 100 in the game system of the present embodiment, will be roughly described.

Figure 5:
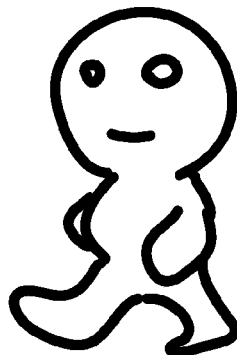
FIG. 5 illustrates an example of the screen of a development game displayed in the game apparatus according to the embodiment of the present invention.

During execution of the development game, for example, as illustrated in FIG. 5, one character to be developed (one developing character) is basically displayed in the display unit 110 and the wearer of the game apparatus 100 can view the displayed character. The character displayed in the display unit 110 is changed to characters having different appearances with the progress of the development game and the growth of the character.

In the game apparatus 100, for example, the development information illustrated in FIG. 14E is used to manage the progress status of the development game. The development information may include evolution history information 1452, fighting record information 1453, amount-of-activity information 1454, condition information 1455, a display status 1456, an evolution score 1457, set mission information 1458, and accomplished mission information 1459 in association with a character ID 1451 uniquely identifying the developing character, as illustrated in FIG. 14E. The evolution history information 1452 indicates the respective characters in the evolution stages that have been undergone to the developing character in the development game that is being executed. The fighting record information 1453 indicates the fighting record (the number of fights and winning or losing) of the fighting game that has been executed using the developing character. The amount-of-activity information 1454 indicates the amount of activity of the developing character. The condition information 1455 indicates the condition of the developing character. The display status 1456 indicates the appearance of the developing character. The evolution score 1457 is referred to determine the evolution target in the next evolution stage. The set mission information 1458 indicates the mission currently set for the developing character. The accomplished mission information 1459 indicates the mission accomplished by the developing character.

The egg type information including at least the developing character in its character group is stored in the recording medium 102 for the development game that is being executed in the game apparatus 100. It is possible to identify which character group the developing character is included in, which egg type the character group belongs to, and which evolution stage the developing character is in based on the character ID 1451 and the egg type information corresponding to the character ID 1451.

The development game is progressed while performing update of the various states of the developing character and accumulation of the evolution score in accordance with the state of activity of the wearer who wears the game apparatus 100. In addition, whether the development game is to be progressed and the evolution targets (the characters in the next evolution stage) are determined based on the amount of accumulation of the evolution score when a measurement time period of one evolution stage elapsed. Various parameters updated during the progress of the development game will be described below. In the development game of the present embodiment, the following various parameters updated during the progress of the development game are described as being managed for the measurement time period determined for each growth stage, being reset after the measurement time period, and being updated again from the initial values in the next growth stage (or the same growth stage that is to be redone).

Amount of Activity

In the game apparatus 100 of the present embodiment, the information about the amount of activity (the amount-of-activity information 1454), which is a first parameter according to the present invention, is updated based on the detection result output from the detection unit 104. In other words, when the wearer performs, for example, walking, running, muscle training, or the like in the state in which the wearer wears the game apparatus 100, the output of the detection result is varied and the amount-of-activity information 1454 indicating the state of activity of the wearer is updated based on the output.

As described above, since the detection unit 104 of the present embodiment is capable of detecting the number of steps and the heart rate, the amount of activity is managed for each of the number of steps and the heart rate. The sum of the numbers of steps detected during the measurement time period set for the growth stage of the developing character (the total number of steps) is stored as the amount of activity concerning the number of steps. The value of the detected heart rate is stored as the amount of activity concerning the heart rate. Since the detection unit 104 outputs the detection result of "the number of steps+1" upon detection of the movement corresponding to one step for the number of steps in the game apparatus 100 of the present embodiment, the amount of activity concerning the number of steps is not updated in a resting state. In contrast, since the detection unit 104 performs the detection at certain time intervals, for example, every five minutes to output the "pulse rate per one minute" as the detection result for the heart rate, the amount of activity concerning the heart rate is updated at equal time intervals.

In other word, in the development game of the present embodiment, the state of activity of the wearer is reflected in the amount of activity of the developing character and the amount of activity of the developing character is increased as the state of activity of the wearer is more active. Accordingly, it is possible to give a sense of unity with the developing character to the wearer. As a result, the wearer has an emotional attachment to the developing character, thus improving the interest of the wearer in the development and the motivation to exercise of the wearer.

Condition

The concept of the condition, which is a second parameter according to the present invention, is provided for the character to make the development game more interesting in the game apparatus 100 of the present embodiment. The condition represents the mental state of the character and is managed in, for example, three stages: "good", "normal", and "bad". The condition of the developing character makes a transition based on the state of activity of the wearer and the condition of the transition is defined in the nature information 1426 as the nature of each character.

The nature of the character is classified into multiple types in accordance with the kind of exercise which the character likes and how the character takes a rest. For example, since the character having a stoical nature tends to like doing strenuous exercises that increase the heart rate to a high value and hate continuation of a non-exercise state, the condition updating method to make a transition to the good condition as the state of the high amount of activity continues longer and make a transition to the bad state as the state of the low amount of activity continues longer is described in the nature information 1426. In contrast, since the character having a lazy nature tends to hate doing strenuous exercises that increase the heart rate to a high value and like continuation of the non-exercise state, the condition updating method to make a transition to the bad condition as the state of the high amount of activity continues longer and make a transition to the good state as the state of the low amount of activity continues longer is described in the nature information 1426.

As described above, as for the condition of the developing character, the parameter (the condition information 1455) is updated with reference to not only the detection result of the state of activity of the wearer but also the nature information 1426 specific to each character. Accordingly, it is possible to realize not the flat development game in which the character grows only in accordance with the activity of the wearer but the highly interesting development game having high strategy, in which, for example, the character preferably grows when the character does the exercise matching with the individual character. Although the two opposite kinds of examples of combination of the nature of the character and the condition updating method are described in the present embodiment, the present invention is not limited to the above examples and other kinds of examples may be combined.

Display Status

The appearance of the developing character to be displayed in the display unit 110 is controlled in accordance with the display status. Multiple kinds of display statuses are provided for one character. The display status of any kind is determined based on the amount-of-activity information 1454 and the condition information 1455 about the developing character, described above, to update the display status 1456.

The display status is basically determined so that the developing character has an appearance in which the state of activity of the wearer is reflected in order to present the sense of unity with the developing character, which is caused by cooperation with the wearer. More specifically, the state of activity of the wearer is classified into, for example, six kinds: "running", "special training", "walking", "normal" "resting", and "no-wearing" illustrated in FIG. 6A in accordance with the amount of activity concerning the number of steps and the amount of activity concerning the heart rate of the developing character, and the display status 1456 of the developing character is updated so as to display the appearance in which the state of activity of the wearer is reflected. Here, although the "no-wearing" state in which none of the amount of activity concerning the number of steps and the amount of activity concerning the heart rate is detected does not strictly correspond to the state of activity of the wearer, the "no-wearing" state is described as one aspect of the state of activity of the wearer for convenience of understanding.

As illustrated in FIG. 6A, in the game apparatus 100 of the present embodiment, the state of activity of the wearer is classified into the above six kinds based on whether the wearer is moving (walking) and the degree of increase of the heart rate from a basic heart rate (comparison with threshold values of two steps). In the example in FIG. 6A, for example, a state in which the difference between the heart rate and the basic heart rate exceeds a higher threshold value (a "high" heart rate state) is classified into the state of activity "running" or the state of activity "special training" based on whether the wearer is moving. The basic heart rate means the average heart rate of the wearer, which is measured at a certain timing in a normal state in which the wearer does not do exercise. The state of activity "resting" is determined on the condition that the state of activity "normal" is continued for a certain time period or longer.

Since the wearer is estimated to be in a status in which the wearer can calmly confirm the state of the developing character in the state of activity "normal" in which the difference between the heart rate and the basic heart rate exceeds a lower threshold value (a "low" heart rate state) and in which the wearer does not moving, the display statuses in which the condition information 1455 is further reflected are set, as illustrated in FIG. 6B. In other words, when the state of activity of the wearer is classified into "normal", the display status corresponding to the condition ("good", "normal", or "bad") of the developing character is set.

The display of the developing character in which the condition is reflected enables the wearer to use the display as a reference of exercise to be later done while confirming whether the exercise is preferable to the development of the character.

Evolution Score

In the game apparatus 100 of the present embodiment, the evolution score is provided as one reference to determine the evolution target of the developing character. The evolution score is a parameter accumulated for each event that has occurred in the developing character during the measurement time period of one evolution stage. The amount of accumulation of the evolution score is calculated for the following three events to update the evolution score 1457 in the game apparatus 100 of the present embodiment.

Variation in the state of activity of the wearer
Fighting result of the fighting game
Continuation of the no-wearing state The amount of accumulation of the evolution score in accordance with the variation in the state of activity of the wearer is determined by correcting a primary score calculated for each of the amount of activity concerning the number of steps and the amount of activity concerning the heart rate based on the condition of the developing character at the calculation timing. The accumulation of the evolution score concerning the number of steps is performed each time the total number of steps exceeds, for example, a multiple of 50 and a predetermined value is set as the primary score. In contrast, the accumulation of the evolution score concerning the heart rate is performed each time the heart rate is measured and a value proportional to the difference between the heart rate and the basic heart rate (the amount corresponding to the increase of the heart rate from the basic heart rate) is calculated as the primary score. The correction based on the condition may be performed by multiplying the primary score by a certain coefficient. For example, the primary score is multiplied by two (in the case of "good"), one (in the case of "normal") or 0.5 (in the case of "bad") to determine the amount of accumulation of the evolution score.

Specifically, the amount of accumulation of the evolution score in accordance with the variation in the state of activity of the wearer is increased (the frequency of accumulation is increased or the amount of accumulation is increased) as the state of activity of the wearer is more active. In addition, the amount of accumulation of the evolution score is controlled so as to be differentiated in accordance with the condition even if the primary score has the same value.

The accumulation of the evolution score in accordance with the fighting result of the fighting game is performed at the timing when the fighting result of the fighting game is given. The amount of accumulation may be basically determined so as to have a positive value (be added) when the character wins the fighting game and to have a negative value (be subtracted) when the character loses the fighting game. Since the advantage-disadvantage relationship may be established with an opponent character due to the difference in the evolution stage, the amount of accumulation of the evolution score in accordance with the fighting result of the fighting game is varied in accordance with the evolution stage of the developing character and the evolution stage of the opponent character.

The amount of accumulation of the evolution score in accordance with the continuation of the no-wearing state may basically have a negative value. In one aspect, this aims to avoid continuation of a state in which the development of the character is abandoned and the subtraction of the evolution score is performed to prompt the user to perform more aggressive gameplay. In another aspect, this aims to keep the interesting experience of the user, which is intended to release the display of the character in an evolution flow described below. The amount of accumulation of the evolution score in accordance with the continuation of the no-wearing state may be used as a remedy to adjust the evolution score that is excessively accumulated to a value that meets the evolution condition to a desired evolution target.

Although the measurement time period is set to, for example, one hour to 48 hours, the user may not want to wear the game apparatus 100 during bath time and during sleeping. When the user is, for example, a preschool child, a state may be continued in which constant wearing is not accepted. Since the subtraction of the evolution score because of the continuation of the no-wearing state may dampen the interest in the development game in the light of such a status, a timer used for the measurement of the measurement time period may be stopped when the game apparatus 100 is powered off. In addition, the character may be set in a dormant state and the timer used for the measurement of the measurement time period may be forcedly stopped in a status in which the wearer is urged to perform excessive continuous exercise and a status in which any disadvantage occurs in the progress of the game, for example, in which the character that is injured in the fighting game or the like is forced to do exercise. In this case, information indicating the above situation to the wearer may be presented with the display unit 110.

Fighting Game

As described above, in the game system of the present embodiment, each user can play the fighting game in which the developing character participates. The fighting game may be, for example, a fighting game that is executed in the game apparatus 100 in response to the proximity wireless communication established when the game apparatus 100 is in proximity to a certain device, a fighting game that is executed in the game apparatus 100 in response to acquisition of information from the fighting card in which the information about the character developed by another user is stored, a fighting game that is executed in another game apparatus 100 in response to storage of the information about the developing character in the fighting card and insertion of the fighting card into the other game apparatus 100, or a fighting game that is executed in the server 300 in response to transmission of the information about the developing character to the server 300 via the dedicated application. In the fighting games of all the aspects, the game apparatus 100 finally acquires the information about the fighting result, and update of the fighting record information 1453 and the evolution score 1457 is performed in the game apparatus 100.

In order to reduce the calculation load in the game apparatus 100, winning or losing of the fighting game may be determined, for example, using a simple method in which the physical power is determined based on the evolution score 1457, the offensive power is determined based on the condition information 1455, and the probability of success of the attack is determined based on the evolution stage and the kind of character for each character participating in the fighting game, the turns of a predetermined number of times and a lottery of whether the attacks of both of the characters succeed are repeated, and the character that has cut the power of the opponent finally wins.

When the fighting game is executed in another device, a notification indicating that the development game is not progressed until the fighting result is acquired may be made so as not to cause a contradiction with the counting results in the game apparatuses 100 and the server 300 and the display of the developing character in the display unit 110 may be stopped.

Mission

In the game apparatus 100 of the present embodiment, setting (ordering) of a mission with which the wearer is prompted to do exercise voluntarily is available in order to preferably progress the development game. The mission is used to set a goal to be accomplished of a certain exercise item. Remuneration (trophy) is given to the developing character on the condition that the goal is accomplished.

Various types of missions may be provided to realize continuous wearing of the game apparatus 100. For example, the missions may include a daily mission that is updated every day and is automatically ordered, a hard mission having the upper limit of the number of orders per day, and a special mission that is ordered at a set timing upon being selected in the dedicated application. The exercise items for which the mission is set may include, for example, an exercise item, such as squat or abdominal muscle, for which the determination of accomplishment is performed based on the detection result in the detection unit 104, in addition to an exercise item for which the determination of accomplishment is performed based on the amount-of-activity information 1454 including the total number of steps and the amount of accumulation of the evolution score since the mission has been ordered. In addition, the exercise items may include an exercise item concerning the execution of the fighting game.

The information about the mission to be ordered and the information about the accomplishment determining method are stored in advance in the recording medium 102. The corresponding mission may be selected in response to a change or selection operation of the day and time or acquisition of information from the smartphone 200 and necessary information may be decomposed in the memory 103.

Evolution

In the development game of the present embodiment, the target character is determined on the condition that the measurement time period for the developing character elapsed. The information about the characters into which the developing character is capable of evolving is included in the evolution condition information 1403 about the corresponding egg type, and any character in the characters into which the developing character is capable of evolving is determined to be the target character. The evolution condition information 1403 defines the evolution condition set for each of the characters into which the developing character is capable of evolving. In the present embodiment, the evolution condition may define the value to be met, for example, for at least one of the amount of accumulation of the evolution score during the measurement time period, the winning percentage of the fighting game, and the number of accomplished missions (the number of given trophies), as illustrated in FIG. 7.

When the measurement time period elapsed, the evolution condition that is accomplished is identified and the target character is determined. When the multiple evolution conditions are accomplished, the target character may be determined based on, for example, the evolution condition the accomplishment of which is most difficult or any evolution condition selected through the lottery, among the multiple evolution conditions.

Upon determination of the target character, a notification indicating that the evolution to the character is available is made in the game apparatus 100. The notification includes a selection item to confirm the user's intention of whether the character is caused to evolve. In the state in which the notification is made, the measurement during the measurement time period is not performed for all the characters until an operation input to the notification is made by the user.

Upon acceptance of the selection operation of an item specifying the evolution into the target character, the evolution from the developing character to the target character is performed through display of a representation concerning the evolution. In other words, after the evolution, the target character is set as a new developing character and the measurement during a new measurement time period is started. More specifically, update of the character ID 1451, update of the evolution history information 1452 (addition of information about the target character), initialization of the fighting record information 1453, the amount-of-activity information 1454, the condition information 1455, the evolution score 1457, and the accomplished mission information 1459, and changing of the display status 1456 based on the amount-of-activity information 1454 and the condition information 1455 that are initialized are performed for the development information concerning the development game that is being executed.

When the selection operation of an item specifying that the evolution into the target character is not to be performed is accepted, the process concerning the evolution is not performed. In this case, the development is continuously performed for the developing character and the measurement during the measurement time period in the same evolution stage is started again after the measurement time period is initialized. At this time, for the development information, only the initialization of the fighting record information 1453, the amount-of-activity information 1454, the condition information 1455, and the evolution score 1457 and the changing of the display status 1456 based on the amount-of-activity information 1454 and the condition information 1455 that are initialized are performed. Enabling the selection of the item specifying that the evolution into the target character is not to be performed ensures the gameplay preferable to the user, for example, when the character is not caused to evolve into a desired target character and when the user does not want the evolution from a favorite character.

Also when no evolution condition is met after the measurement time period elapsed, a notification indicating that no evolution condition is met is made and re-measurement in the same evolution stage is prompted in the above manner.

Dedicated Application

The functions of the dedicated application executed in the smartphone 200 in the game system of the present embodiment will now be described. With the dedicated application of the present embodiment, it is possible to realize the gameplay of the fighting game via the server 300, the browsing of the user ranking counted in the server 300, the ordering procedure of the special mission, and the browsing of the evolution flow concerning the egg type capable of being developed in the development game.

Gameplay of Fighting Game and Browsing of User Ranking

As described above, in the game system of the present embodiment, the user can perform the gameplay with the developing character participating in the fighting game executed in the server 300. The gameplay of the fighting game is provided on the condition that the communication connection is established between the game apparatus 100 used by the user and the smartphone 200 and the development information about the development game that is being executed is reflected in the dedicated application. In the fighting game executed via the dedicated application, winning or losing may be determined using the same process as in the fighting game executed in the game apparatus 100 or a play experience different from that in the game apparatus 100 may be provided.

The user ranking based on the fighting result is created for the fighting game executed in the server 300 and acquisition of information about the user ranking enables browsing of information about the users in the ranks within a certain range in the dedicated application. In the browsing of the user ranking, the information about the character used in the fighting game by the user who has performed at least the operation input concerning the selection can be browsed.

Ordering Procedure of Special Mission

The user can perform the ordering procedure of the special mission, among the missions that can be set in the game apparatus 100 of the present embodiment, via the dedicated application. The ordering procedure includes presentation of the missions that can be ordered, acceptance of the selection of the mission to be set, and transmission of the information about the selected mission from the smartphone 200 to the game apparatus 100, on the dedicated application.

Browsing of Evolution Flow

The development game executed in the game apparatus 100 of the present embodiment is capable of present to the user how the egg type capable of being developed evolves into any character belonging the egg type through the branching of the evolution. In the game of such an aspect, the interesting experience of the evolution into the character of an unknown aspect is presented to the user while the interest of the user in the development game may be reduced in a state in which the user does not know the presence of the evolvable characters. Accordingly, in the dedicated application of the present embodiment, it is possible to realize the browsing of the evolution flow to present to the user the character group belonging to the egg type available in the development game in the game apparatus 100.

In the development flow concerning the egg types, at least the number of kinds of characters in each evolution stage, that is, the number of characters capable of evolving in each evolution stage can be identified for the character group belonging to the egg type, for example, as illustrated in FIG. 8A. FIG. 8A is a diagram illustrating an example of the evolution flow displayed in an initial state in which the development game of the character of the egg type is not executed in the game apparatus 100 associated with the dedicated application. Although all the characters are represented using icons in an unidentifiable aspect (represented with "?") in the evolution flow in FIG. 8A, the number of kinds of evolvable characters is indicated by the number of icons arranged in each evolution stage. After the development game is started in the associated game apparatus 100, the evolution flow is displayed with the developed characters being changed to an identifiable aspect, as illustrated in FIG. 8B, on the condition that the communication connection is established between the smartphone 200 and the game apparatus 100 and the development information is acquired. The information about the developed characters is included in the evolution history information 1452 in the acquired development information. The display information about the evolution flow is updated based on the information about the developed characters to control the display of the evolution flow.

As illustrated in FIG. 8B, as for the developing character, lines between the corresponding characters in the evolution flow are displayed in color so that the characters in the evolution stages that have been undergone to the developing character are identified. The development game of the present embodiment is a game in which repetition of the development from the initial character is supposed. Particularly, it may be difficult to identify the growth process to the developing character in a state in which the number of the characters changed to the identifiable aspect in the evolution flow are increased. Accordingly, for example, when the communication connection is established and the development information is acquired, the evolution flow may be displayed while representing stepwise identification of the characters in the evolution stages that have been undergone to the developing character in the development game that is being executed.

The characters displayed in the identifiable aspect in the evolution flow are displayed, for example, in a manner illustrated in FIG. 9A in which the characters in the next stage into which the corresponding character is capable of evolving are identified on the condition that a long-press operation or the like on the display of the corresponding characters is accepted. In the example in FIG. 9A, when the long-press operation on a character 901 is accepted, the lines connecting the character 901 to characters 902 and 903 for which the evolution condition is defined for the character 901 are displayed in color to indicate that the character 901 is capable of evolving into the characters 902 and 903. Adopting the above display mode even in a state in which the corresponding characters in the next evolution stage are not developed, as illustrated in FIG. 9B, enables guiding of the user to the repetitive gameplay.

Figure 10A:
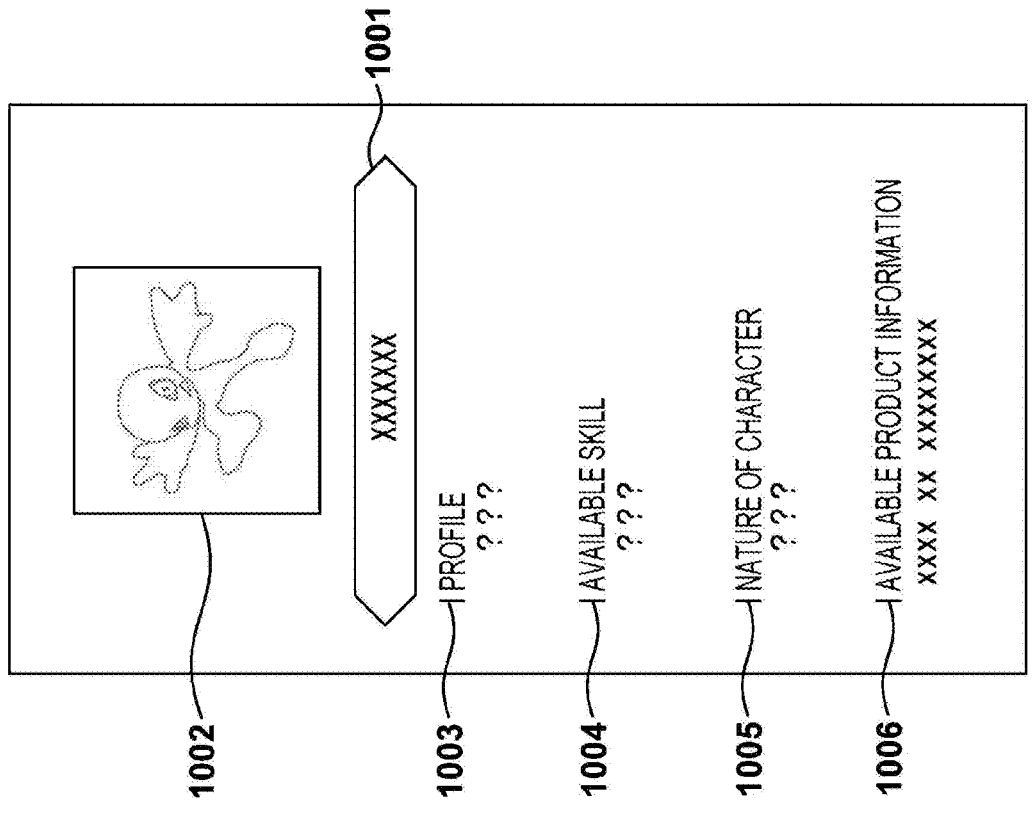
FIG. 10A and FIG. 10B are diagrams illustrating detailed information about a character displayed in the smartphone according to the embodiment of the present invention.

As for the characters displayed in the identifiable aspect in the evolution flow, detailed information about the characters is displayed on the condition that the selection operation for the display of the characters is accepted. The detailed information is defined in the detailed information 1413 in the belonging character information about the character. For example, as illustrated in FIG. 10A, the detailed information may include items of a character name 1001 of the character, a character image 1002, a profile 1003, an available skill 1004, a nature-of-character 1005, and available product information 1006.

In terms of increasing the interest of the user in the development game, the change of the character to the identifiable aspect in the evolution flow does not require the character to be developed in the associated game apparatus 100. For example, the change may be performed on the condition that information about the character used by another user in the user ranking is acquired or that information about the opponent character in the fighting game is acquired. In other words, the change of the character to the identifiable aspect in the evolution flow may be performed based on the acquisition of the information identifying the character from the external apparatus, such as the server 300 or a device with which the proximity wireless communication is established, which is different from the game apparatus.

Figure 10B:
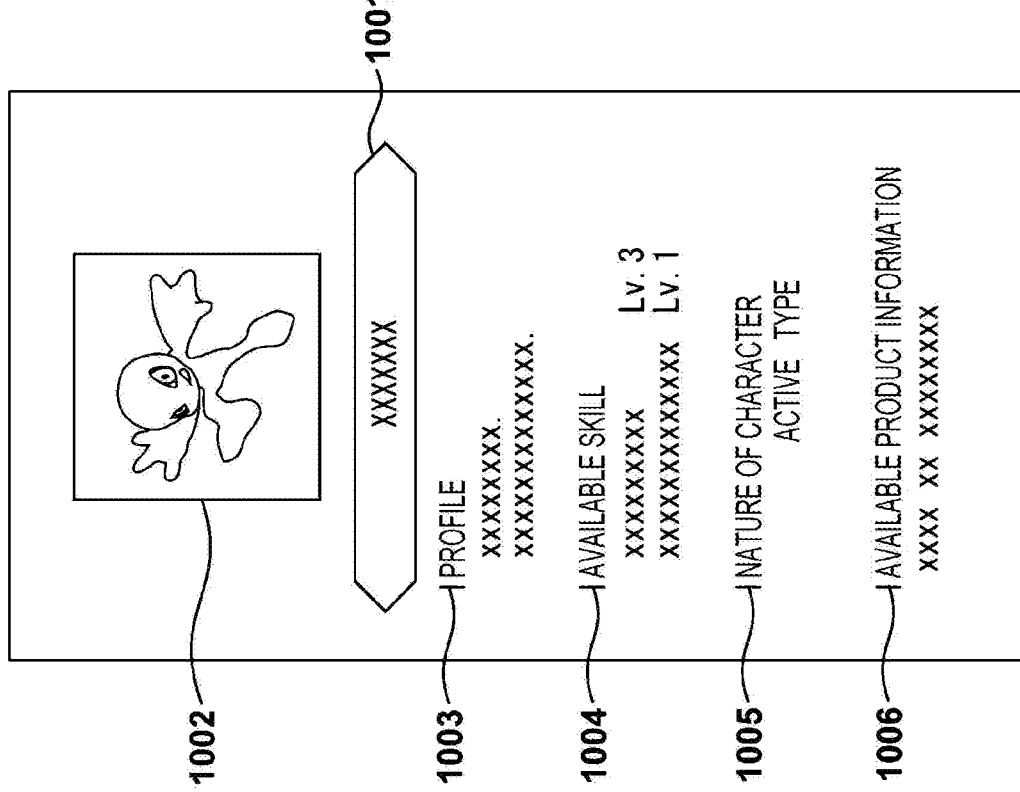

The fairness between the users is not ensured, for example, if the browsing of the information about the character used by another user is supposed to be in the same state as in the case in which the character has been developed. Accordingly, the identifiable aspect changed based on the information acquired from the external apparatus is controlled so as to be differentiated from the aspect changed based on the development information acquired from the associated game apparatus 100. The difference in the identifiable aspect of the character may be represented by, for example, in a manner in which a blurry monochrome image is displayed in the former aspect while a vivid color image is displayed in the latter aspect. The display performed on the condition that the operation input on the display of the character displayed in the identifiable aspect in the evolution flow is accepted may be made different from the display in the aspect based on the development information. For example, a notification indicating that the display of the information identifying the characters in the next stage is not browsable may be made or only the character name 1001, the character image 1002, and the available product information 1006 may be displayed as the display items in the detailed information (FIG. 10B). In other words, the change of the display of the character in the evolution flow is controlled so that the display is varied based on whether the character has been developed.

Although all the characters are described as being in the unidentifiable aspect in the evolution flow in the initial state in the present embodiment, the present invention is not limited to this and it is sufficient to display at least part of the characters in the unidentifiable aspect. In addition, the evolution flow may include secret characters that are not displayed as the icons in the unidentifiable aspect in the initial state. If the information about the secret character is acquired as the information about the character used by another user in the user ranking, the secret character may be controlled so as not to be displayed in the evolution flow on the above condition. The secret characters may be controlled so as to be displayed only if the information about the secret characters is included in the development information received from the associated game apparatus 100.

Figure 11:
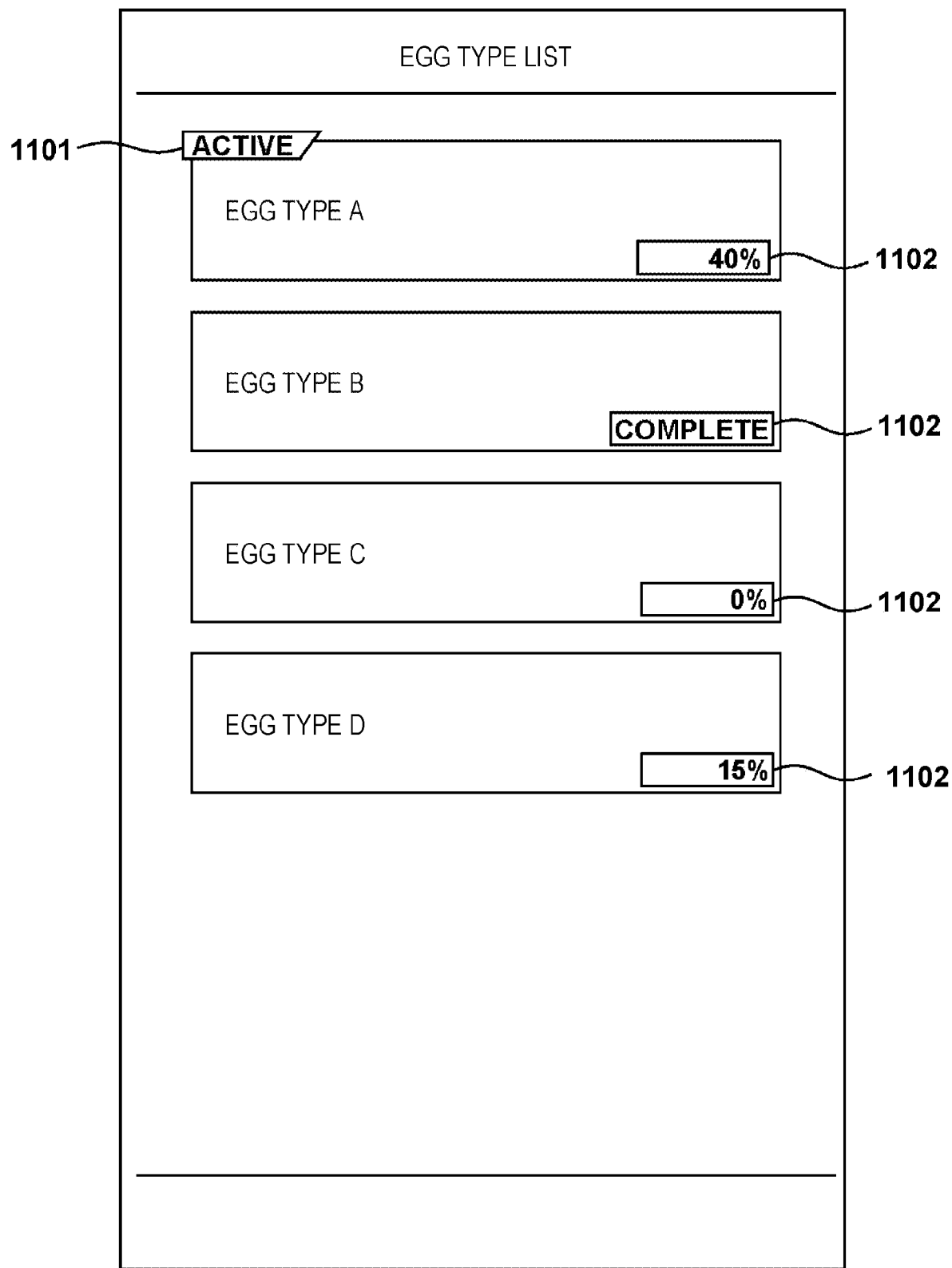
FIG. 11 is a diagram illustrating an example of the screen of a list of egg types displayed in the smartphone according to the embodiment of the present invention.

The evolution flow may be provided for each character group belonging to the egg type and may be browsable also at an arbitrary timing when the development information from the associated game apparatus 100 is not acquired. For example, prior to the browsing of the evolution flow, a screen of a list of multiple egg types, illustrated in FIG. 11, may be provided and the evolution flow of the corresponding egg type may be displayed on the condition that an operation to select any egg type is accepted on the screen. As illustrated in FIG. 11, on the screen of the list of the egg types, an identification 1101 may be added to the egg type to which the character currently being developed in the associated game apparatus 100 belongs, that is, the egg type to which the character in the development information that has recently been acquired belongs to make the egg type determinable. In the example of the screen of the list in FIG. 11, information 1102 about the state of change of the characters included in the evolution flow of each egg type to the identifiable aspect is displayed (for example, the percentages of characters changed to an aspect in which all the detailed information is capable of being confirmed are displayed).

The egg type capable of being developed in the development game may be added in response to reception of necessary information from the external apparatus, such as the server 300 or a device with which the proximity wireless communication is established, for example, in selling of a new egg type card or in buying of download content.

State Control Process

Figure 12:
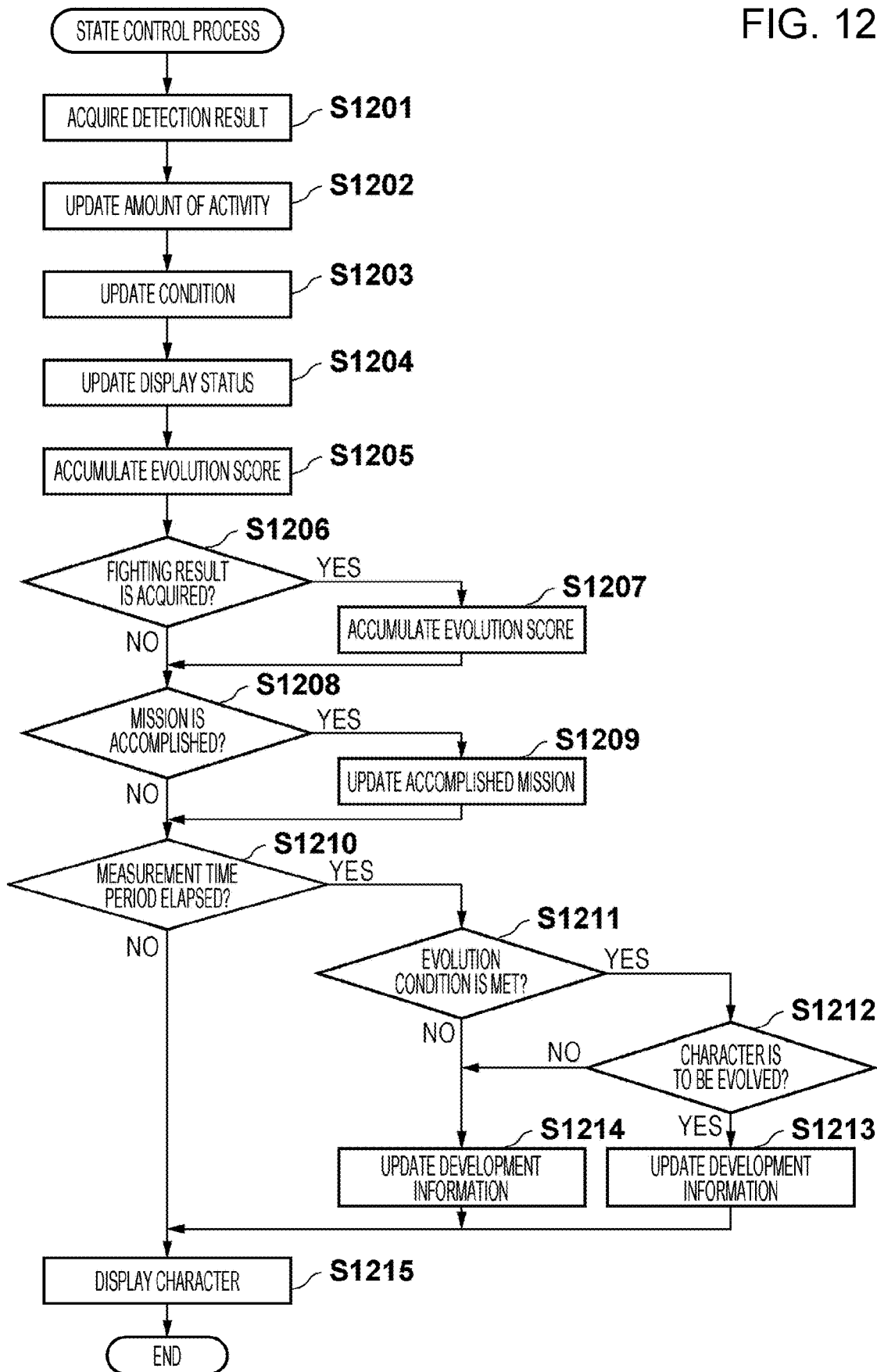
FIG. 12 is a flowchart illustrating a state control process performed in the game apparatus according to the embodiment of the present invention.

A state control process that is performed to control the display state of the developing character in the game apparatus 100 of the present embodiment will now be specifically described with reference to a flowchart in FIG. 12. The process illustrated in FIG. 12 is realized by the control unit 101, which reads out the corresponding processing program from, for example, the recording medium 102 and decomposes the processing program in the memory 103 for execution. The state control process is described as being started, for example, when the game apparatus 100 is turned on.

Referring to FIG. 12, in Step S1201, the control unit 101 acquires information about the state of activity of the wearer from the detection result in the detection unit 104.

In Step S1202, the control unit 101 updates the amount of activity of the developing character based on the information in the detection result acquired in Step S1201. More specifically, the control unit 101 calculates the amount of activity concerning the number of steps and the amount of activity concerning the heart rate based on the information in the detection result to update the amount-of-activity information 1454 in the development information.

In Step S1203, the control unit 101 updates the condition of the developing character based on the nature information 1426 about the developing character and the information in the detection result. More specifically, the control unit 101 acquires the nature of the developing character with reference to the nature information 1426 in the egg type information stored in the recording medium 102 and identifies the condition that is changed in accordance with the detection result of the state of activity of the wearer to update the condition information 1455 in the development information.

In Step S1204, the control unit 101 updates the display status of the developing character based on the amount-of-activity information 1454 and the condition information 1455 that are updated. More specifically, the control unit 101 classifies the state of activity of the wearer based on the amount-of-activity information 1454 that is updated and, if the state of activity of the wearer is classified into a state other than "normal", updates the display status 1456 in the development information based on the classification result. If the state of activity of the wearer is classified into "normal", the control unit 101 updates the display status 1456 in the development information based on the condition information 1455 that is updated.

In Step S1205, the control unit 101 performs a process concerning the accumulation of the evolution score of the developing character based on the amount-of-activity information 1454 and the condition information 1455 that are updated. More specifically, the control unit 101 calculates the primary score based on the amount-of-activity information 1454 that is updated and calculates the amount of accumulation of the evolution score by multiplying the primary score by a coefficient corresponding to the condition information 1455 that is updated to update the evolution score 1457 in the development information (to change the evolution score 1457 in the development information to a value to which the amount of accumulation is added).

In Step S1206, the control unit 101 determines whether the information about the fighting result of the fighting game executed using the developing character is acquired. If the control unit 101 determines that the information about the fighting result is acquired (YES in Step S1206), the process goes to Step S1207. If the control unit 101 determines that the information about the fighting result is not acquired (NO in Step S1206), the process goes to Step S1208.

In Step S1207, the control unit 101 performs the process concerning the accumulation of the evolution score of the developing character based on the information about the fighting result. More specifically, the control unit 101 calculates the amount of accumulation of the evolution score based on information about winning or losing included in the information about the fighting result and information about the evolution stages of the developing character and the opponent character to update the evolution score 1457 in the development information. In addition, the control unit 101 updates the fighting record information 1453 in the development information based on the information about winning or losing in the fighting result.

In Step S1208, the control unit 101 determines whether a mission accomplishment condition that is set is met. The determination in Step S1208 is performed based on the information about the mission included in the set mission information 1458 and the corresponding information in the development information. If the control unit 101 determines that the mission accomplishment condition that is set is met (YES in Step S1208), the process goes to Step S1209. If the control unit 101 determines that the mission accomplishment condition that is set is not met (NO in Step S1208), the process goes to Step S1210.

In Step S1209, the control unit 101 deletes information about an accomplished mission from the set mission information 1458 and adds accomplishment information about the corresponding mission and information about giving of remuneration to the accomplished mission information 1459.

In Step S1210, the control unit 101 determines whether the measurement time period in the evolution stage of the developing character elapsed. If the control unit 101 determines that the measurement time period elapsed (YES in Step S1210), the process goes to Step S1211. If the control unit 101 determines that the measurement time period does not elapse (NO in Step S1210), the process goes to Step S1215.

In Step S1211, the control unit 101 determines whether any evolution condition of the characters into which the developing character is capable of evolving is met based on the fighting record information 1453, the evolution score 1457, and the accomplished mission information 1459 in the development information. If the control unit 101 determines that any evolution condition of the characters into which the developing character is capable of evolving is met (YES in Step S1211), the process goes to Step S1212. If the control unit 101 determines that no evolution condition is met (NO in Step S1211), the process goes to Step S1214.

In Step S1212, the control unit 101 controls the display control unit 106 so as to display a notification indicating whether the character is caused to evolve in the display unit 110 and determines whether the selection operation to evolve the character is performed in response to the notification. If the control unit 101 determines that the selection operation to evolve the character is performed (YES in Step S1212), the process goes to Step S1213. If the control unit 101 determines that the selection operation not to evolve the character is performed (NO in Step S1212), the process goes to Step S1214.

In Step S1213, the control unit 101 causes the display control unit 106 to produce a representation of the evolution from the developing character to the target character and updates the development information. Then, the process goes to Step S1215. The update in Step S1213 includes changing of the character ID 1451 to the character ID of the target character, addition of the character ID of the target character to the evolution history information 1452, initialization of the fighting record information 1453, the amount-of-activity information 1454, the condition information 1455, the evolution score 1457, and the accomplished mission information 1459, and changing of the display status 1456 based on the amount-of-activity information 1454 and the condition information 1455 that are initialized. In addition, the control unit 101 starts the measurement during the measurement time period in the evolution stage of the target character.

If the measurement time period elapsed but the evolution is not to be performed, in Step S1214, the control unit 101 causes the display control unit 106 to make a notification indicating that the evolution is not to be performed and the development game is continued in the same growth stage and updates the development information. Then, the process goes to Step S1215. The update in Step S1214 may be the same as the one performed in Step S1213 except that the character ID 1451 and the evolution history information 1452 are not changed. In addition, the control unit 101 initializes the measurement during the measurement time period in the evolution stage of the developing character and starts the measurement again.

In Step S1215, the display control unit 106 displays the developing character in the display unit 110 in an aspect based on the updated display status 1456 under the control of the control unit 101. Then, the state control process illustrated in FIG. 12 is terminated.

With the game apparatus of the present embodiment, it is possible to realize the gameplay of the more interesting development game having the improved diversity in the development while raising the motivation to exercise of the wearer in the above manner.

Display Process

A display process that is performed to display the evolution flow upon reception of the development information from the associated game apparatus 100 in the smartphone 200 in the game system of the present embodiment will now be specifically described with reference to a flowchart in FIG. 13. The process illustrated in FIG. 13 is realized by the terminal control unit 201, which reads out the program of the dedicated application from, for example, the terminal recording medium 202 and decomposes the program in the terminal memory 203 for execution.

The display process is described as being started, for example, upon reception of the development information from the associated game apparatus 100. It is assumed that, prior to the execution of the display process, information identifying the developed characters based on the development information that has been received (released character information) and information identifying the characters that have not been developed (limitedly-released character information), which is acquired through, for example, the browsing of the user ranking, are stored in the terminal recording medium 202. It is assumed that, for the evolution flow to be displayed, information about the characters that were in the identifiable aspect when the characters were displayed (release status information) is managed in the terminal recording medium 202 in association with information indicating whether the information about the characters are determined to be in the identifiable aspect based on the released character information or the limitedly-released character information.

Figure 13:
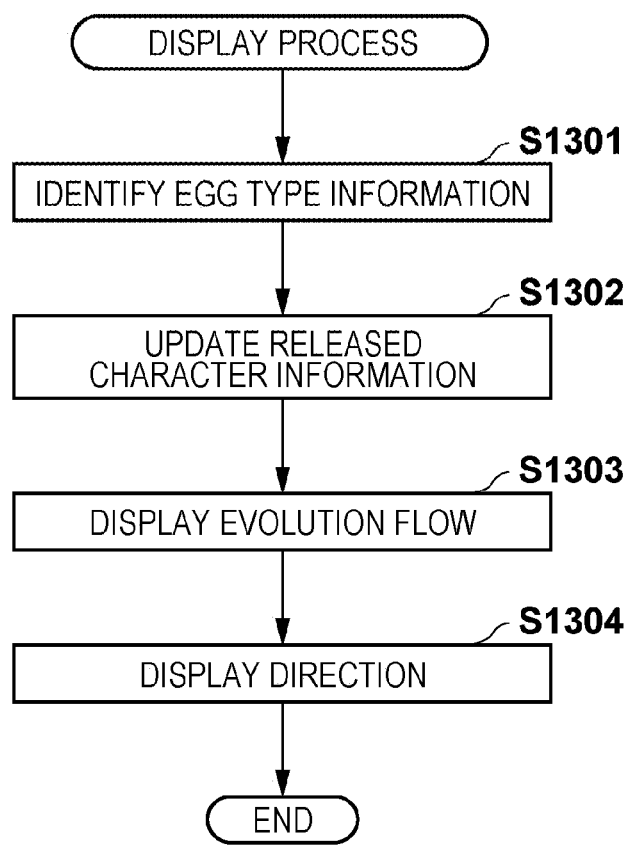
FIG. 13 is a flowchart illustrating a display process performed in the smartphone according to the embodiment of the present invention.

Referring to FIG. 13, in Step S1301, the terminal control unit 201 identifies the egg type information including the developing character based on the received development information. More specifically, the terminal control unit 201 identifies the egg type information including the character ID that is equal to the character ID 1451 in the development information in the belonging character information 1402.

In Step S1302, the terminal control unit 201 updates the released character information stored in the terminal recording medium 202 based on the evolution history information 1452 in the received development information. When the information about the character included in the limitedly-released character information is included in the evolution history information 1452, the terminal control unit 201 deletes the information about the character from the limitedly-released character information.

In Step S1303, the terminal display control unit 205 causes the terminal display unit 210 to display the evolution flow identified in Step S1301 under the control of the terminal control unit 201. At this time, the terminal display control unit 205 performs a process to identify the character a display aspect of which is varied in the current display of the evolution flow with reference to the release status information to change the display aspect of the character. Specifically, the terminal display control unit 205 keeps the unidentifiable display aspect for the character that is included in none of the release status information, the released character information, and the limitedly-released character information. The terminal display control unit 205 performs a process to change the display aspect of the character that is not included in the release status information but is included in the released character information or the limitedly-released character information from the unidentifiable display aspect to the identifiable display aspect. At this time, the character included in the limitedly-released character information is changed to an aspect in which the appearance of the character is displayed with a blurry monochrome image and the character included in the released character information is changed to an aspect in which the appearance of the character is displayed with a vivid color image. In addition, the terminal display control unit 205 changes the aspect to display the appearance of the character that is included in the release status information but is determined to be in the identifiable aspect based on the limitedly-released character information, if the character is included in the released character information, to the aspect using a vivid color image.

In Step S1304, the terminal display control unit 205 superimposes a representation of stepwise identification of the developing character and the characters in the evolution stages that have been undergone to the developing character on the evolution flow displayed in Step S1303 under the control of the terminal control unit 201.

With the information communication terminal of the present embodiment, it is possible to enable easy understanding of the characters to be developed in the above manner.

Other Embodiments

The present invention is not limited to the above embodiments and various modifications and changes are available within the range of the gist of the invention without departing from the spirit or scope of the following claims. The game system according to the present invention may be realized by a program causing one or more computers to function as the respective apparatuses in the game system. The program may be provided or distributed using a computer-readable recording medium or over a telecommunication line.

The invention claimed is:

1. A game apparatus that provides a user with gameplay for development of one or more characters that develop through a plurality of development stages, the game apparatus comprising:
   a heart rate sensor that detects a heartbeat of the user;
   an acceleration sensor that detects movement of the user;
   a display capable of displaying a screen of the gameplay; and
   processing circuitry configured to execute the gameplay based on the activity information of the user that includes heart rate information obtained by the heart rate sensor and movement information obtained by the acceleration sensor, wherein
   the game apparatus is configured as a single device that the user can wear on the user's body portion,
   the gameplay including:
      updating a first parameter based on the heart rate information and the movement information;
      accumulating a development score based on at least the first parameter, the development score relating to development of a character being developed;
      determining a target character in development of the character being developed based on the accumulated development score; and
      creating the screen of the gameplay and displaying the screen on the display, wherein
   the gameplay further includes determining a state of activity of the user into one of states of activity classified by a combination of the heart rate information and the movement information, and
   the screen includes display of appearance of the character being developed, the appearance corresponding at least to the determined state of activity of the user.

2. The game apparatus according to claim 1, wherein
   the heart rate information constituting a part of the combination represents high and low levels of a heart rate of the user, and
   the movement information constituting a part of the combination represents presence and absence of movement of the user.

3. The game apparatus according to claim 1, wherein
   in the gameplay,
      the first parameter is updated to a higher value as the state of activity of the user becomes more active, and
      an amount of accumulation of the development score is increased as the first parameter becomes higher.

4. The game apparatus according to claim 1, wherein
   the gameplay further includes updating a second parameter based on a change of the state of activity of the user,
   in the gameplay, the development score is accumulated based on the first parameter and the second parameter.

5. The game apparatus according to claim 4, wherein
   in the gameplay, the amount of accumulation of the development score is determined by correcting the first parameter based on the second parameter.

6. The game apparatus according to claim 4, wherein
   in the game play, an updating manner of the second parameter based on the change of the state of activity of the user depends on the character being developed.

7. The game apparatus according to claim 4, wherein
   the appearance of the character being developed further corresponds to the second parameter.

8. The game apparatus according to claim 1, wherein
   the user's body portion is the user's wrist, finger, upper arm, hip, or leg.

* * * * *